(12) United States Patent
Neumiller et al.

(10) Patent No.: US 6,226,283 B1
(45) Date of Patent: May 1, 2001

(54) METHOD AND SELECTOR FOR PERFORMING SELECTION IN A COMMUNICATION SYSTEM

(75) Inventors: Phillip D. Neumiller, Cary; Peter Lei, Arlington Heights; Randall R. Stewart, Crystal Lake, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/311,794

(22) Filed: May 13, 1999

(51) Int. Cl.[7] .................................................. H04Q 7/28
(52) U.S. Cl. ......................... 370/340; 370/342; 455/522
(58) Field of Search .................................. 370/412, 340, 370/331, 465, 391, 335, 332, 342, 338, 401, 395, 479; 375/222, 200, 206; 455/437, 442, 439, 453, 522, 525, 63

(56) References Cited

U.S. PATENT DOCUMENTS

| | | | |
|---|---|---|---|
| 5,673,266 | * | 9/1997 | Li .......................................... 370/465 |
| 5,745,520 | * | 4/1998 | Love et al. ............................ 370/342 |
| 5,923,650 | * | 7/1999 | Chen et al. ............................ 370/331 |
| 5,940,762 | * | 8/1999 | Lee et al. .............................. 455/442 |
| 5,999,816 | * | 12/1999 | Tiedemann, Jr. et al. ........... 455/437 |
| 6,088,360 | * | 7/2000 | Amaral et al. ........................ 370/412 |

\* cited by examiner

Primary Examiner—Wellington Chin
Assistant Examiner—Prenell Jones
(74) Attorney, Agent, or Firm—Kenneth A. Haas (57) ABSTRACT

Frames received by base stations (base stations) (103–107) are assigned a frame-quality indicator (FQI) by the base station. FQI information for all frames received is continuously backhauled to a switch (101). The switch (101) sidehauls the FQI information to a call anchoring base station, where a determination of a base station with the best FQI for each frame takes place. Once the anchoring base station determines a base station with the best FQI for a particular frame, the anchoring base station sends a FORWARD_FRAME message to the base station with the best FQI, or, if the anchoring base station is the base station with the best FQI, nothing is sent to the other base stations. Once the FORWARD_FRAME message is received by a base station, the base station immediately forwards the frame (identified by the frame number) to the switch (101). The switch (101) then routes the selected frame accordingly.

17 Claims, 6 Drawing Sheets

METHOD AND SELECTOR FOR PERFORMING SELECTION IN A COMMUNICATION SYSTEM

FIELD OF THE INVENTION

The present invention relates generally to wireless communication systems and in particular, to performing selection within such wireless communication systems.

BACKGROUND OF THE INVENTION

Selection and distribution within wireless communication systems is known in the art. One such communication system employing selection and distribution is a Code Division Multiple Access (CDMA) communication system as described in Cellular System Remote unit-Base Station Compatibility Standard of the Electronic Industry Association/Telecommunications Industry Association Interim Standard 95A (IS-95A/B), which is incorporated by reference herein. (EIA/TIA can be contacted at 2001 Pennsylvania Ave. NW Washington D.C. 20006). As described in IS-95A, as a remote unit moves to the edge of a cell, it may commence communication with an adjacent base station (base transceiver station BTS as described in the TIA reference), while the current base station continues to handle the call. The call is then handled simultaneously by both base stations. During such a scenario, the remote unit is said to be in soft handoff. Soft handoff provides diversity of forward traffic channels and reverse channel paths on the boundaries between base stations. Each base station involved in a particular soft handoff, demodulates the traffic channel frames and provides the frames to a selector function. The selector function then selects the best frame from each of the active call legs and that frame is forwarded on to the rest of the communication network. Likewise, the communication network provides frames to a distribution function that are to be transmitted to the remote unit. The distribution function distributes these frames to all base stations involved in soft handoff with the remote unit.

In current CDMA communication systems, to support soft handoff, all selection/distribution functions take place in software/hardware entities (e.g., Mobil Switching Centers (MSCs), Centralized Base Station Controllers (CBSCs), . . . , etc.) apart from base transceiver stations within the communication system. Base transceiver stations within prior-art communication systems are simply hardwired to a single selection unit that does not vary with time. While such a configuration is adequate for existing CDMA communication systems, this configuration is inadequate for next generation CDMA communication systems, since all next generation CDMA systems virtually eliminate the need for MSCs and CBSCs. Therefore, a need exists for a method and apparatus for performing selection within a communication system that is capable of accommodating next generation CDMA communication systems.

DETAILED DESCRIPTION OF THE DRAWINGS

To address the need for selection within a communication system, a method and apparatus for performing selection within a communication system is provided. In the preferred embodiment of the present invention selection takes place internal to base transceiver stations within the communication system. Frames received by base stations are assigned a frame-quality indicator (FQI) by the base station. FQI information for all frames received is continuously backhauled to a switch (or radio access network router). The switch sidehauls the FQI information to a call anchoring base station, where a determination of a base station with the best FQI for each frame takes place. Once the anchoring base station determines a base station with the best FQI for a particular frame, the anchoring base station sends a FORWARD_FRAME message to the base station with the best FQI, or, if the anchoring base station is the base station with the best FQI, nothing is sent to the other base stations. Once the FORWARD_FRAME message is received by a base station, the base station immediately forwards the frame (identified by a frame number) to the switch. The switch then routes the selected frame accordingly.

The above-described method for selection results in nothing being sidehauled except FQI bits (and packet header) for ⅓ of the time for a call in 3-way soft handoff assuming an equal distribution of poor quality frames. For ⅔ of the time FORWARD_FRAME messages are being sidehauled. Assuming a 22-byte full-rate voice frame with an 8-byte header, the sidehaul requirements are approximately 1.41 times the channel capacity for a cell with all dedicated remotely located selector functions.

The present invention encompasses a method for performing selection within a communication system. The method comprises the steps of receiving first frame quality information (FQI) bits from a first base station, where the first FQI bits corresponds to a quality of a frame received by the first base station. Second FQI bits are received from a second base station, where the second FQI bits corresponds to a quality of the frame received by the second base station. A base station having a best FQI bits is determined from the first FQI bits and the second FQI bits and a message is transmitted to the base station having the best FQI bits, instructing the base station to forward the frame to a destination.

The present invention additionally encompasses a method for performing selection within a communication system. The method comprises the steps of receiving, by a first base station, a frame transmitted by a remote unit and determining, by the first base station, a first frame quality for the frame. The method additionally comprises receiving, by the first base station, a second frame quality for the frame received by a second base station and determining a base station having a best frame quality. A message is transmitted to the second base station when the second base station is the base station having the best frame quality. In the preferred embodiment of the present invention the message instructs the second base station to forward the frame to a destination.

The present invention additionally encompasses a selector having a plurality of frame quality information (FQI) bits as an input, and an output comprising a message to a base station having a best frame quality, wherein the message instructs the base station to forward a frame to a destination.

Figure 1:
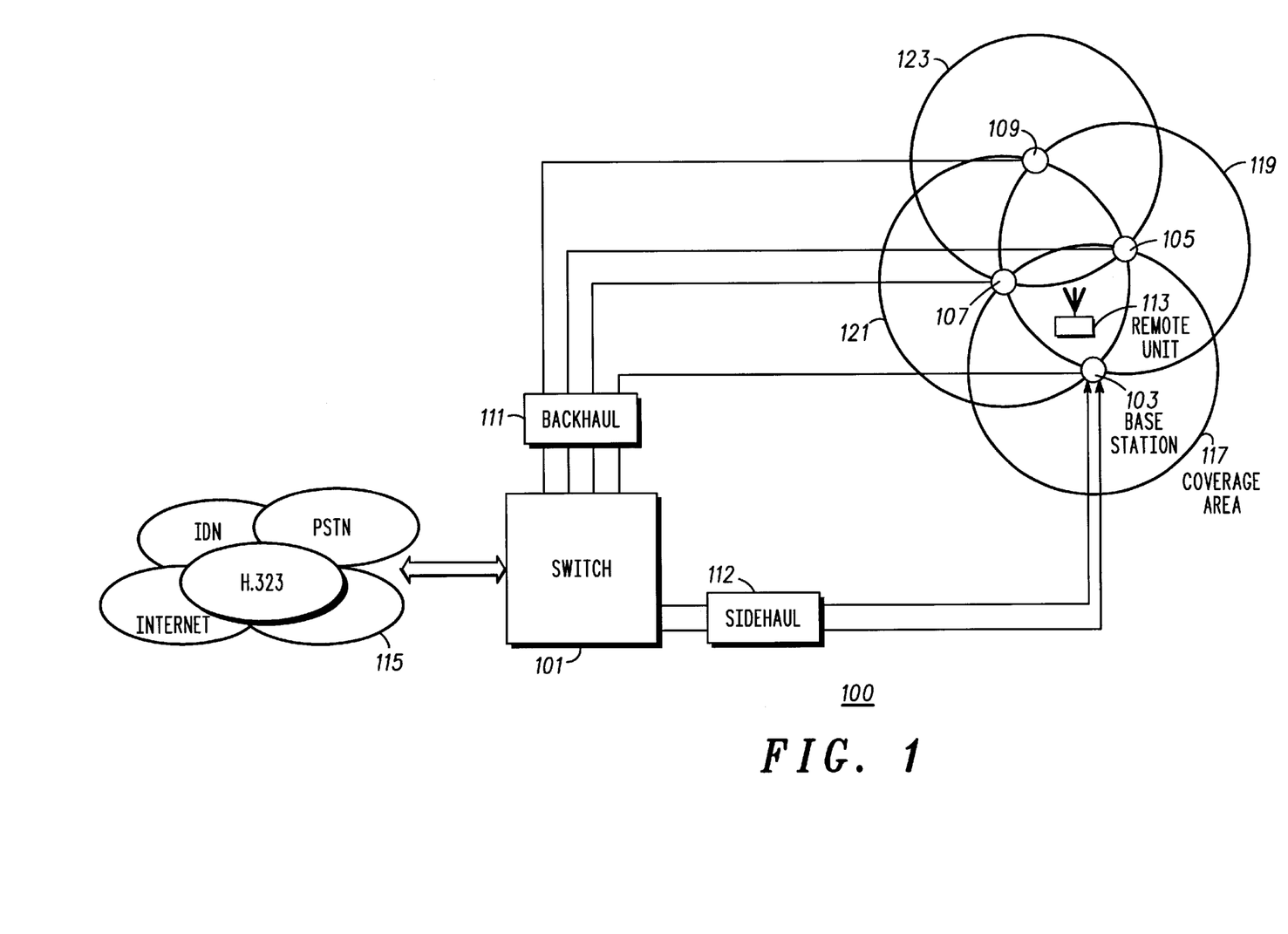
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. In the preferred embodiment of the present invention, communication system 100 utilizes a CDMA system protocol as described in IS-95A/B, but in alternate embodiments communication system 100 may utilize other analog or digital cellular communication system protocols that require a macro-diversity frame selection and distribution to take place.

Communication system 100 comprises base stations 103-109, each having respective coverage area 117–123, remote unit 113, backhaul 111, switch 101, sidehaul 112, and gateway 115. In the preferred embodiment of the present invention base stations 103–109 are preferably Motorola, Inc. base stations that are configured with processors, memories, instruction sets, and the like, to function in any suitable manner to perform the function set forth herein. Additionally, in the preferred embodiment of the present invention, switch 101 comprises a packet switch (router) such as a Cisco Model MGX-8800 or other network access equipment. Cisco can be contacted within the United States at 170 West Tasman Dr., San Jose, Calif. 95134. Backhaul 111 and sidehaul 112 comprise T1 span lines that terminate at switch 101 and each base station 103–109, but in alternate embodiments of the present invention, backhaul 111 and sidehaul 112 may comprise other backhaul and sidehaul means such as Optical Connection 3 (OC3), fiber optic cable, . . . , etc. Finally, gateway 115 may connect communication system 100 to any service network, such as, but not limited to, a Public Switched Telephone Network (PSTN), an Integrated Switched Digital Network (ISDN), an International Telecommunication's Union (ITU) H.323 network, a Wide Area Network (WAN), a Local Area Network (LAN), a digital subscriber line (DSL) or an internet network.

As shown, remote unit 113 currently exists in coverage areas 117–121, and is in three way soft handoff with base stations 103–107. In the preferred embodiment of the present invention, a single call anchoring base station from base stations 103–107 is chosen to perform selection, and call processing functions for the particular call (i.e., act as a call anchoring base station for the particular call) based on a statistic, which in the preferred embodiment of the present invention is a work-load metric. The determination of the call anchoring base station is made based on the base station with a lowest mean work load (in this example base station 103). During communication with remote unit 113, frames received by base stations 103–107 are assigned a frame-quality indicator (FQI) by the base station. In the preferred embodiment of the present invention FQI is preferably quality bits from the forward error correction (FEC) function that is used on the radio channel. The FEC function may or may not involve an additional automatic repeat request (ARQ) on the link. Thresholds are configurable via operations and maintenance processes or dynamically adjusted via optimization algorithms. In alternate embodiments of the present invention, other FQIs may be utilized instead (e.g., Reed Solomon, BCH codes, Turbo codes, . . . etc.)

For non-anchoring base stations 105–107 FQI information for all frames received is continuously backhauled to switch 101 via backhaul 111. In particular, base stations 105–107 continuously backhaul a FQI_SIDEHAUL message containing base station identification, mean base station work load, call identification, and FQI. Switch 101 then sidehauls the FQI information to the call anchoring base station (in this case, base station 103), where a determination of a base station with the best FQI for each frame takes place.

Once the anchoring base station determines a base station with the best FQI for a particular frame, the anchoring base station sends a FORWARD_FRAME message to the base station with the best FQI, or, if the anchoring base station is the base station with the best FQI, nothing is sent to the other base stations. The FORWARD_FRAME message comprises a frame number and a destination address. Once the FORWARD_FRAME message is received by a base station, the base station immediately forwards the frame (identified by the frame number) to switch 101. In the preferred embodiment of the present invention the identified frame is transmitted in packet form with an address field comprising the destination address. Switch 101 then routes the selected frame to gateway 115, and ultimately to the destination address.

In the preferred embodiment of the present invention all frames transmitted to switch 101 is done so via a packet protocol such as an Internet Protocol (IP). However, other packet protocols may be utilized instead of IP (e.g., Frame Relay or Asynchronous Transfer Mode (ATM)). A variety of voice/data compression formats may also be used over 1P networks. Synchronization of the IP packets and pathway setup between base stations is achieved using real time streaming protocol (RTSP) as described in Internet Engineering Task Force (IETT) Request for Comment 2326. CDMA soft hand over adds are handled as "an addition of a media server (in our case a base station) to a conference" in RTSP parlance. Quality of Service (QoS) are maintained by using Resource Reservation Protocol (RSVP) an IETF draft standard. In the preferred embodiment of the present invention User Datagramn Protocol (UDP) port numbers are used to identify individual data/voice channels. A large variety of backhaul multiplexing methods work with this method as one skilled in the art can easily recognize.

The above-described method for selection results in nothing being sidehauled except FQI bits for ⅓ of the time for a call in 3-way soft handoff assuming an equal distribution of poor quality frames. For ⅔ of the time FORWARD_FRAME messages are being sidehauled. Assuming a 22-byte full-rate voice frame with an 8-byte header, the sidehaul requirements are approximately 1.41 times the channel capacity for a cell with all dedicated remotely located selector functions.

Figure 2:
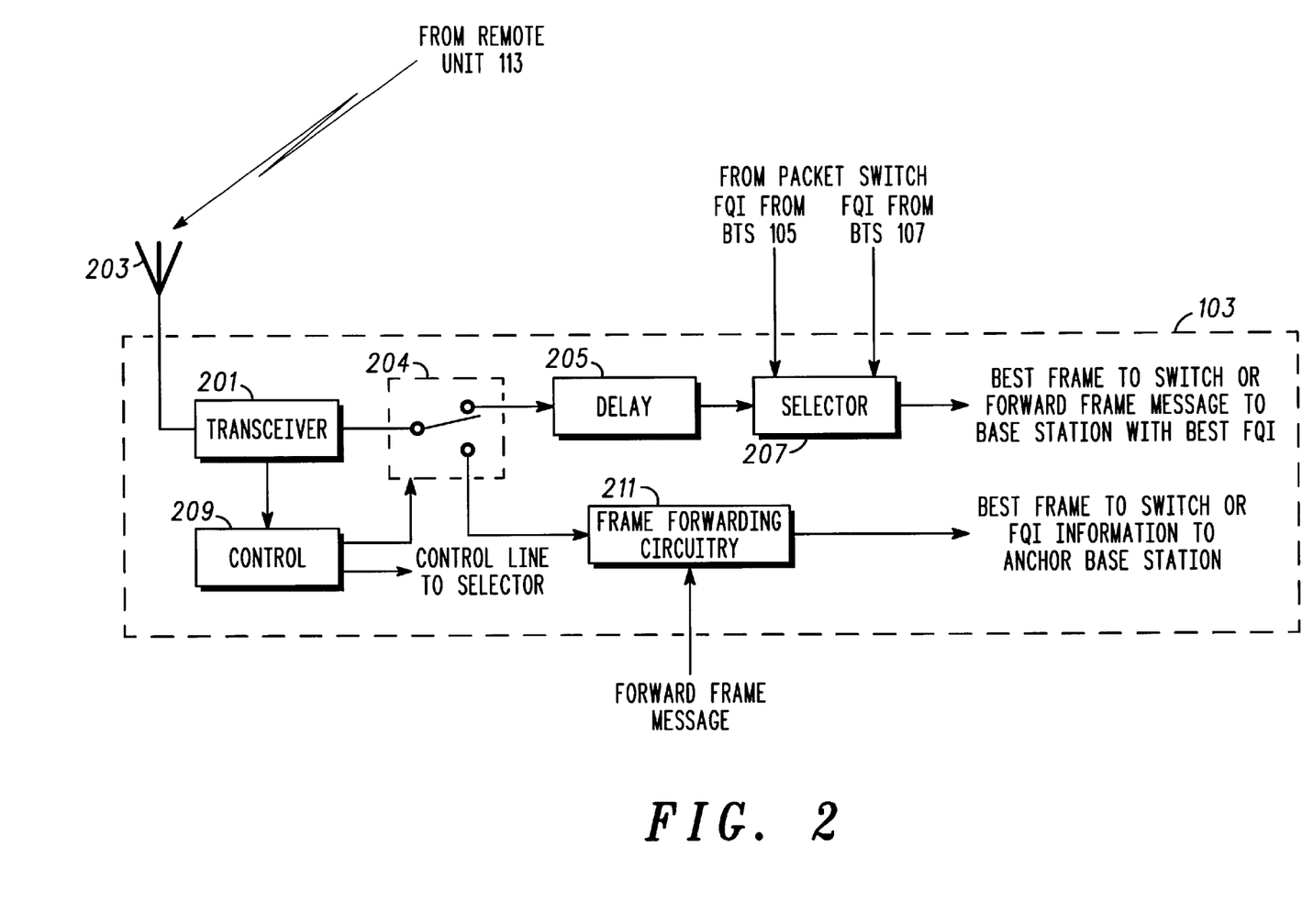
FIG. 2 is a block diagram of a base station of FIG. 1 in accordance with the preferred embodiment of the present invention.

FIG. 2 is a block diagram of a base station 103 of FIG. 1 in accordance with the preferred embodiment of the present invention. Base station 103 comprises antenna 201, transceiver 203, switch 204, delay circuitry 205, selector circuitry 207, controller 209, and frame-forwarding circuitry 211. In the preferred embodiment of the present invention selection circuitry 207 comprises software/hardware that performs CDMA frame selection as described above. In other words, selector 207 determines a base station having a best FQI for a particular frame and instructs that base station to forward the frame to switch 101 by sending the FQI_SIDEHAUL message. During operation of base station 103, control circuitry 209 determines if base station 103 will be performing selector functions or not. As discussed above, the determination of the call anchoring base station is made based on the base station with a lowest mean work load, which is also exchanged in the METRIC SIDEHAUL message in addition to the FQI_SIDEHAUL. The METRIC_SIDEHAUL bidding process may be performed independently of the FQI bidding process.

During time periods when base station 103 is performing selection, frames received by transceiver 203 are output to switch 204. Controller 209 instructs switch 204 to pass frames received from transceiver 203 to delay circuitry 205 and to selector 207. In the preferred embodiment of the present invention, delay circuitry 205 serves to delay frames for an amount of time so that frames from all base stations in soft handoff with remote unit 113 enter selector 207 simultaneously. Selector 207 determines an FQI for the received frame and receives FQI information for the frame from base stations in soft handoff with remote unit 113 via the FQI_SIDEHAUL message. Selector 207 then selects the base station with the best FQI from all base stations involved in soft handoff with remote unit 113. If the anchor base station (i.e., base station 103) is the base station with the best FQI for the frame, then the anchor base station passes the frame to switch 101 (via IP packet). However, if the anchoring base station does not have the best FQI for the frame, then a FORWARD_FRAME message is passed to the base station having the best FQI for the frame.

During time periods when base station 103 is not performing selection functions for a particular call (i.e., does not have the lowest mean work load of all base stations in soft handoff with remote unit 113), controller 209 instructs switch 204 to pass all frames received from transceiver 203 to frame-forwarding circuitry 211, bypassing selector 207. Frame-forwarding circuitry 211 determines FQI information for frames entering circuitry 211 and continuously sidehauls the FQI information to an anchor base station. When a FORWARD_FRAME message is received by circuitry 211, circuitry 211 forwards the frame identified in the message to gateway 115, and ultimately to a destination address identified in the message.

It should be noted that in the preferred embodiment of the present invention the decision of whether a base station is going to act as an anchor base station for a particular call is made on a call-by-call basis. Therefore, for each remote unit in communication with a base station, a determination is made as to which base station in soft handoff with the remote unit has the lowest work-load, and that base station performs selection functions. For example, a particular base station may be acting as an anchor base station for a first remote unit, yet may be acting as a non-anchor base station for a second remote unit. During such a situation, the particular base station will be receiving communication from both remote units, each in soft handoff with a particular group of base stations. While acting as the call anchor, the base station has the lowest mean work load for all base stations in soft handoff with the first remote unit, yet will not have the lowest mean work load for base stations in soft handoff with the second remote unit.

Figure 3:
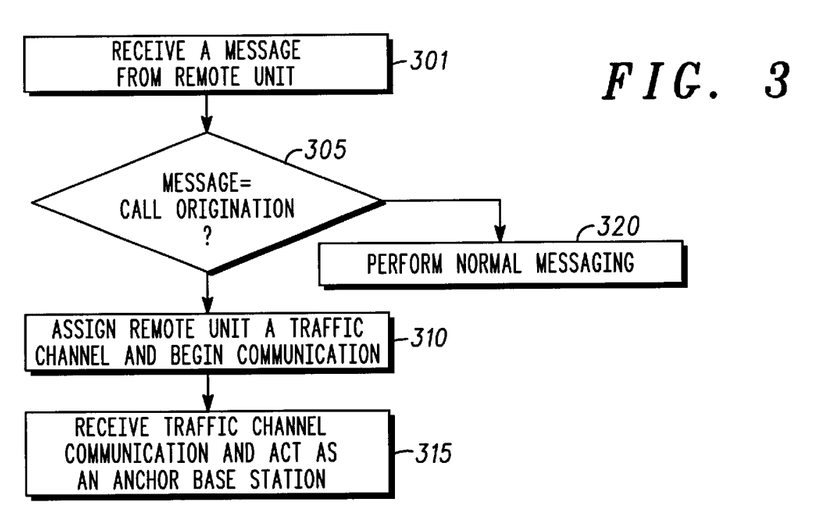
FIG. 3 is a flow chart illustrating operation of the base station of FIG. 1 in accordance with the preferred embodiment of the present invention during a call origination.

FIG. 3 is a flow chart illustrating operation of the base station of FIG. 1 during a call origination in accordance with the preferred embodiment of the present invention. In other words, FIG. 3 is a flow chart showing the operation of base station 103 during those time periods when remote unit 113 first accesses communication system 100. At step 301, base station 103 receives a message from remote unit 113, and at step 305, base station 103 determines if the message is a call origination message. If, at step 305, base station 103 determines that remote unit 113 has sent a call origination message, then the logic flow continues to step 310 where base station 103 assigns remote unit 113 a traffic, channel and begins communication with remote unit 113 via the traffic channel. At step 315, base station 103 receives transmissions from remote unit 113 and acts as the default anchor for the call, routing all frames to switch 101. Thus, in the preferred embodiment of the present invention during all call originations, the base station receiving the call origination will automatically default to performing anchor functionality until soft handoff legs are added to the call. Returning to step 305, if base station 103 determines that the message sent from remote unit 113 is not a call origination message, then the logic flow continues to step 320, where normal messaging takes place (e.g., pages, page responses, registrations, . . . , etc.) between remote unit 113 and base station 103. The logic flow then returns to step 301.

Figure 4:
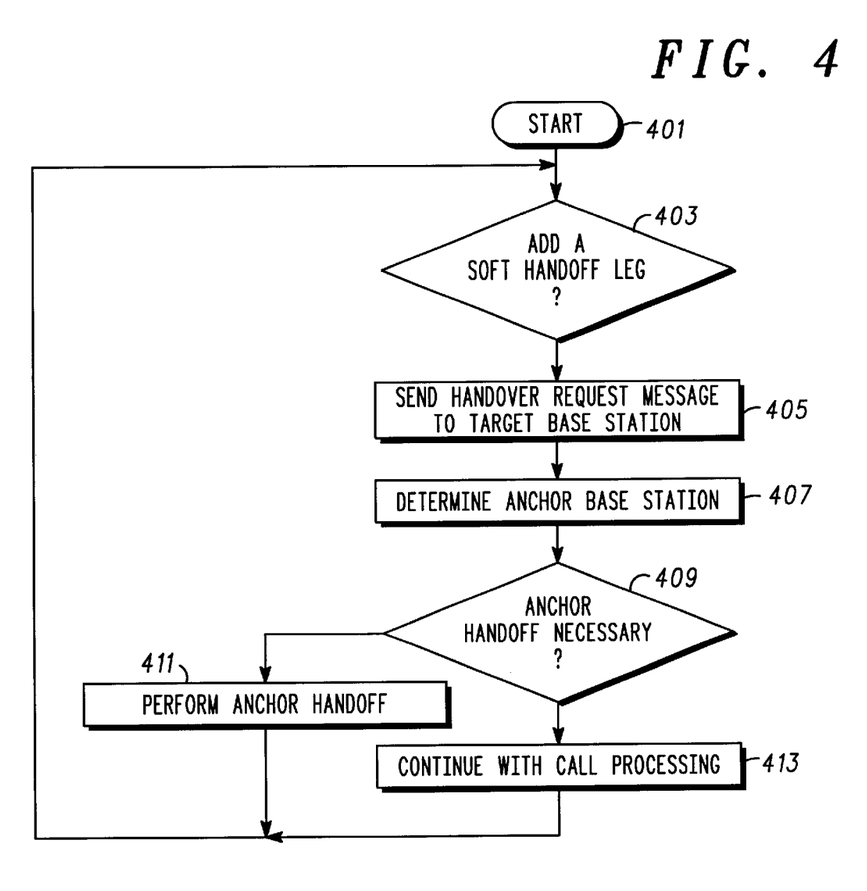
FIG. 4 is a flow chart illustrating operation of the base station of FIG. 1 during soft handoff in accordance with the preferred embodiment of the present invention.

FIG. 4 is a flow chart illustrating operation of base station 103 in accordance with the preferred embodiment of the present invention during soft handoff. The logic flow begins at step 401 where remote unit 113 has successfully originated a call, and is communicating with base station 103. As described above with reference to FIG. 3, base station 103 is performing anchor functionality until soft handoff legs are added to the call. At step 403, controller 209 determines if a soft handoff leg should be added to the call. This is accomplished by control circuitry 209 receiving a signal strength measurement (IS-95A/B Pilot Strength Measurement Message (PSMM) of a neighboring base station and determines if the PSMM is greater than a threshold (IS-95A/B T_ADD). If at step 403, it is determined that a soft handoff leg should be added to the current call, then the logic flow continues to step 405 where a handover request message is routed to the target base station (e.g., base station 105). In the preferred embodiment of the present invention the handover request message is routed from control circuitry 209 through switch 101, and finally to target base station 105.

At step 407 a determination is made as to which base station (i.e., base station 103 or base station 105) should serve as the call anchoring base station. As discussed above, the call anchoring base station is chosen based on the current work load for each base station, and the base station having the lowest mean work load is chosen to perform anchor functionality. Next, at step 409, controller 209 determines if an anchor handover is necessary. In other words, controller 209 determines if base station 105 should be performing anchor functionality for the particular call (i.e., selection and call processing/control). If at step 409 it is determined that an anchor handover is necessary, then the logic flow continues to step 411 where an anchor handoff is performed, and base station 105 begins performing anchor functionality for the particular call and the logic flow returns to step 403. However, if at step 409, it is determined that an anchor handoff is not necessary, then at step 413 base station 103 continues performing anchor functionality (i.e., selection and call processing/control) and the logic flow returns to step 403.

Figure 5:
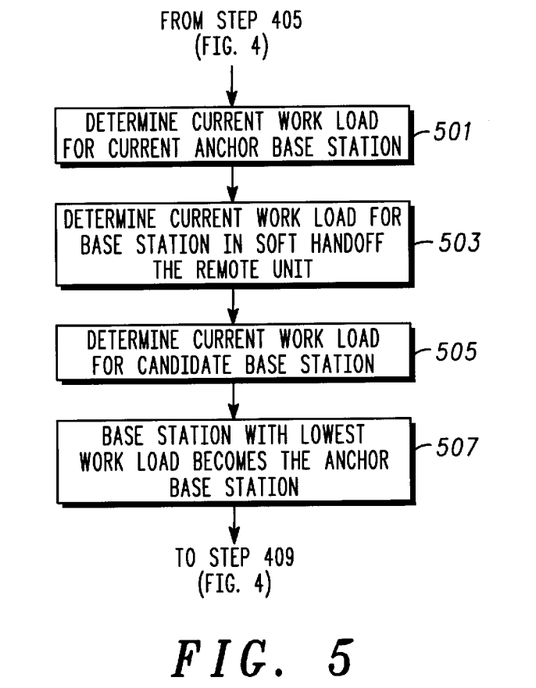
FIG. 5 is a flow chart showing the selection of a call anchoring base station in accordance with the preferred embodiment of the present invention.

FIG. 5 is a flow chart showing the selection of a call anchoring base station in accordance with the preferred embodiment of the present invention (step 407 of FIG. 4). The logic flow begins at step 501 where controller 209 determines the current work load for the current call anchoring base station (i.e., base station 103). In the preferred embodiment of the present invention the current work load is defined as being the current backhaul utilization for the call anchoring base station, however other work-load functions may be utilized as well. Next, at step 503, a current work load for base stations in soft handoff is determined. In the preferred embodiment of the present invention this is accomplished by the call anchoring base station receiving periodic updates of the work load for all base stations within the active set along with sidehauled frame information (i.e., within the FQI_SIDEHAUL message). Thus, those base stations that are not acting as a call anchoring base station for the particular call, will periodically deliver a work load metric to the call anchoring base station along with the FQI sent to the call anchoring base station.

In alternate embodiments of the present invention, other forms of determining the current work load for base stations within the active set are envisioned. For example, all base stations currently in soft handover with remote unit 113 (i.e., all base stations within the IS-95A/B active set) can be sent a request to provide the current call anchoring base station with a current work load metric. This may take place by transmitting a control message to all base stations within the IS-95A/B active set via switch 101 in accordance with standard switching techniques.

Continuing, at step 505 a current work load is determined for the candidate base station (i.e., base station for which soft handover is requested). Finally, at step 507 a base station having the lowest work load is determined. For example, if the current call anchoring base station is utilizing 80% of its backhaul capacity, and a anchor candidate base station is utilizing 50% of its backhaul capacity, then the anchor candidate base station has a lower work load than the current call anchoring base station. The logic flow continues to step 409 (FIG. 4).

Figure 6:
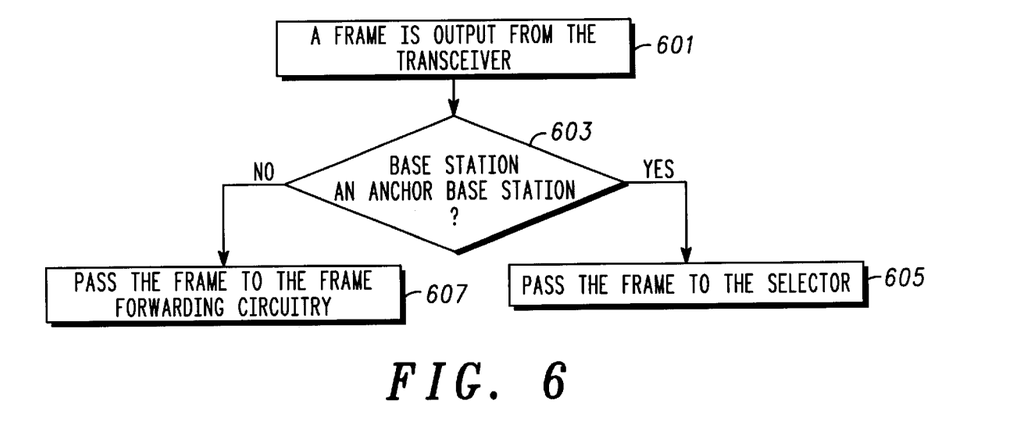
FIG. 6 is a flow chart showing operation of the switch of FIG. 2 in accordance with the preferred embodiment of the present invention.

FIG. 6 is a flow chart showing operation of the switch of FIG. 2 in accordance with the preferred embodiment of the present invention. The logic flow begins at step 601 where a frame is output from transceiver 203 to switch 204. Next, at step 603 controller 209 determines if the base station is operating as an anchor base station. If at step 603 it is determined that the base station is an anchor base station, then the logic flow continues to step 605 where switch 204 passes the frame to selector 207, otherwise the logic flow continues to step 607 where switch 204 passes the frame to frame forwarding circuitry 211.

Figure 7:
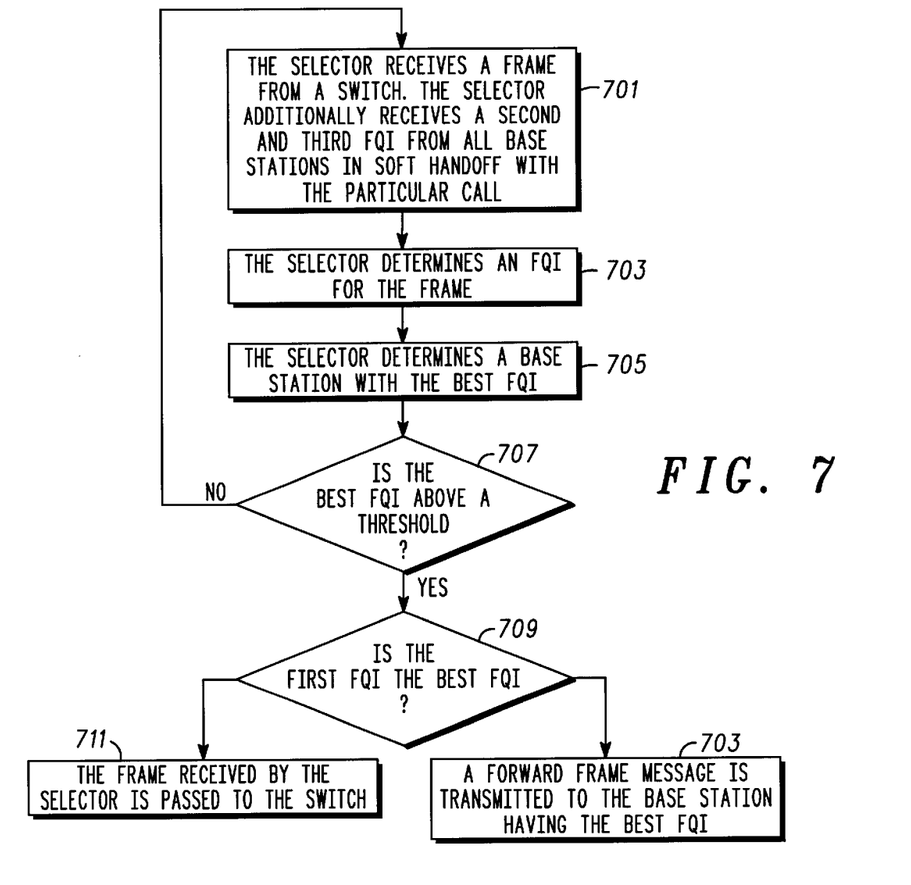
FIG. 7 is a flow chart showing the operation of the selector of FIG. 2 in accordance with the preferred embodiment of the present invention.

FIG. 7 is a flow chart showing the operation of selector 207 in accordance with the preferred embodiment of the present invention. The logic flow begins at step 701 where selector 207 receives a frame (received from transceiver 203) from a particular call from switch 204. Additionally, at step 701, selector 207 receives second and third FQI from all base stations in soft handoff with the particular call via the FQI_SIDEHAUL message. As discussed above, FQI information from a base station indicates the quality of a particular frame that was received by the base station. By receiving FQI information from all base stations in soft handoff with the remote unit, selector 207 receives information on how well each base station in soft handoff with the remote unit received the frame.

Continuing, at step 703, selector 207 determines first FQI for the frame received from switch 204. At step 705 selector 207 determines a base station that has the best FQI for the frame. At step 707 selector 207 compares the best FQI to a threshold and determines if the best FQI is above a threshold. In the preferred embodiment of the present invention it is anticipated that situations arise where all frames received by the base stations in soft handoff with a remote unit will have a poor FQI. In these situations it is desirable to have no frame passed to switch 101 (provided it is not needed). Therefore, if at step 707, selector 207 determines that the best FQI is not above the threshold, then the logic flow simply returns to step 701, with no frame being passed to switch 101. However, if at step 707 it is determined that the best FQI is above the threshold, then the logic flow continues to step 709 where selector determines if the first FQI (received by the anchor base station) is the best FQI and if so, the logic flow continues to step 711 where the frame received by selector 207 is passed (in packet form) to switch 101. If, however, it is determined that the best FQI is not the first FQI, then the logic flow continues to step 713 where a FORWARD_FRAME message is transmitted to the base station having the best FQI.

Figure 8:
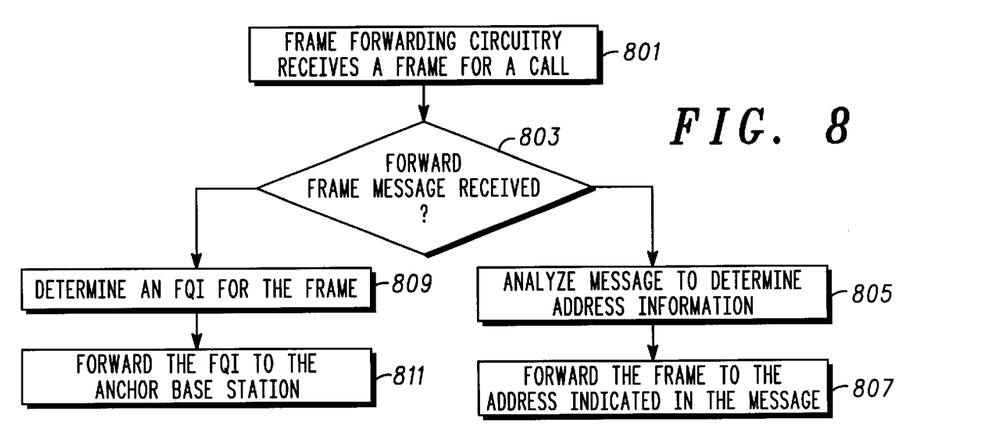
FIG. 8 is a flow chart showing operation of the frame-forwarding circuitry of FIG. 2 in accordance with the preferred embodiment of the present invention.

FIG. 8 is a flow chart showing operation of the frame-forwarding circuitry of FIG. 2 in accordance with the preferred embodiment of the present invention. The logic flow begins at step 801 where frame-forwarding circuitry 211 receives a frame (received from transceiver 203) from a particular call from switch 204. Next, at step 803 frame-forwarding circuitry 211 determines if a FORWARD_FRAME message has been received indicating that the frame for the particular call should be forwarded to switch 101. If at step 803 it is determined that a FORWARD_FRAME message has been received, then the logic flow continues to step 805 where the message is analyzed to determine address information, and at step 807 the frame is forwarded to the address indicated in the FORWARD_FRAME message.

Returning to step 803, if it is determined that a FORWARD_FRAME message has not been received, then the logic flow continues to step 809 where an FQI is determined for the frame. Next, at step 811 the FQI is transmitted to the anchoring base station.

Figure 9:
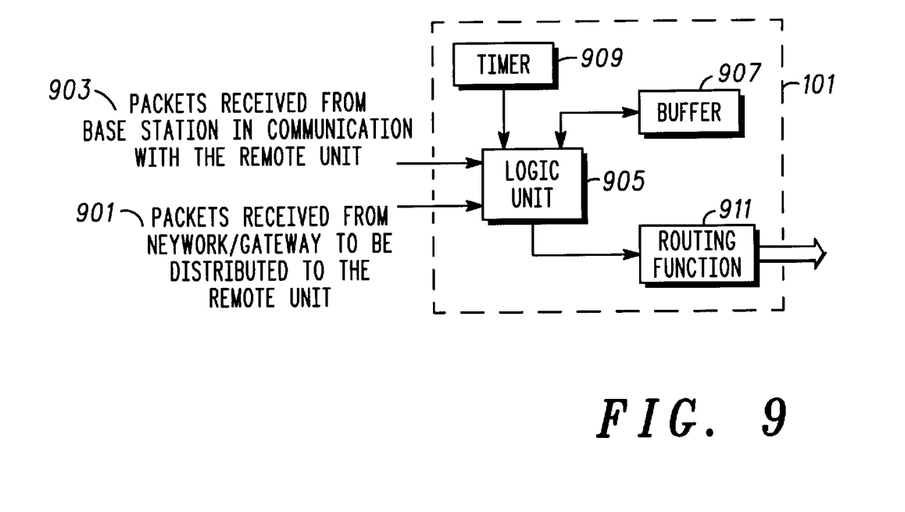
FIG. 9 is a block diagram of the switch of FIG. 1 in accordance with the preferred embodiment of the present invention.

FIG. 9 is a block diagram of the switch of FIG. 1 in accordance with the preferred embodiment of the present invention. In the preferred embodiment of the present invention switch 101 performs distribution functions by distributing packets to base stations that were most recently heard from. More particularly, as gateway 115 provides frames to switch 101, switch 101 distributes the frames to all base stations in communication with remote unit 113. In order to determine the plurality of base stations requiring the frames, an identification of base stations (on a per-call basis) currently backhauling data to switch 101 for the call is maintained. Switch 101 then distributes frames received from gateway 115 to those base stations currently providing uplink frames to switch 101 for the particular call. Unlike prior-art methods of distribution, in the preferred embodiment of the present invention base stations involved in a particular call do not need to identify themselves. Switch 101 "remembers" the base stations providing uplink frames for an identified call, and distributes downlink frames for the call to those base stations. Switch 101 comprises logic unit 905, buffer 907, timer 909, and routing function 911. Operation of switch 101 in accordance with the preferred embodiment of the present invention occurs as described in FIG. 10.

Figure 10:
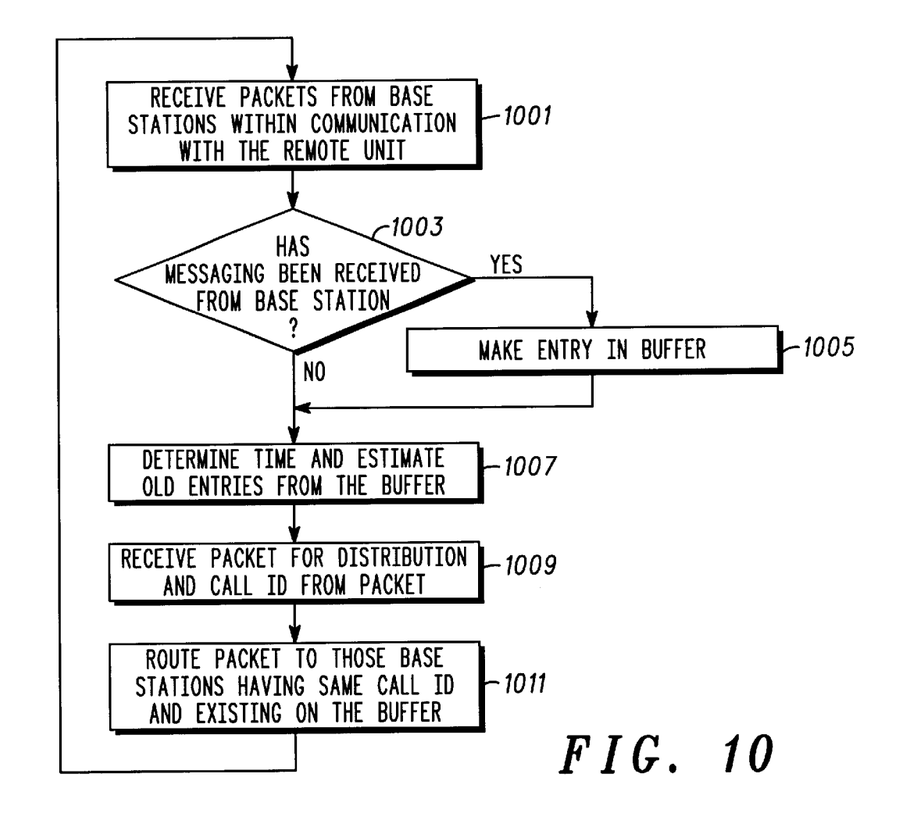
FIG. 10 is a block diagram showing operation of the switch of FIG. 1 in accordance with the preferred embodiment of the present invention.

The logic flow begins at step 1001 where packets from base stations in communication with remote unit 113 are received. As described above, during communication with remote unit 113, frames received from remote unit 113 by base stations 103–107 are assigned a frame-quality indicator (FQI) by the base stations. For non-anchoring base stations 105–107 an FQI for the frames received is continuously backhauled to switch 101 via the FQI_SIDEHAUL message. Additionally, once the anchoring base station determines a base station with the best FQI for a particular frame, the anchoring base station sends a FORWARD_FRAME message to switch 101, to be routed to the base station with the best FQI. At step 1003 logic unit 905 determines if messaging has been received from a base station. In the preferred embodiment of the present invention logic unit 905 determines if either a FORWARD_FRAME message or a FQI_SIDEHAUL message has been received by switch 101, however, in alternate embodiments of the present invention, other messages may be utilized without varying from the scope of the invention. If a message has been received by switch 101 an entry in buffer 907 is made (step 1005). In particular, at step 1005 logic unit 905 enters the base call identification, station identification, and time for the particular message within buffer 907. The logic flow continues to step 1007. If, at step 1003, it is determined that neither a FORWARD_FRAME message or a FQI_SIDEHAUL message has been received by switch 101, then the logic flow simply continues to step 1007. At step 1007 logic unit 905 determines a current time and eliminates those entries from buffer 907 that have been existing on buffer 907 for greater than a predetermined amount of time (e.g., 140 ms (alternatively based on network conditions)). In particular, logic unit 905 determines the time stored on buffer 907 for the particular entry, compares the time stored with a current time, and erases all entries older than a predetermined age.

At step 1009 logic unit 905 receives downlink packets for distribution and determines a call identification for the packet. At step 1011, logic unit 905 checks the contents of buffer 907 to determine all of the entries corresponding to the particular call identification. In other words, at step 1011 logic unit 905 identifies a plurality of base stations currently providing uplink data for an identified call. At step 1013, logic unit 905 routes the packets to routing function 911 for distribution to those identified base stations existing on buffer 907, having a similar call identification (i.e., in soft handoff with a similar remote unit). The logic flow then returns to step 1001.

While the invention has been particularly shown and described with reference to a particular embodiment, it will be understood by those skilled in the art that various changes in form and details may be made therein without departing from the spirit and scope of the invention. For example, although selection functionality takes place within a base station, one of ordinary skill in the art will recognize that selection in accordance with the preferred embodiment of the present invention may occur in other network elements (e.g., switch 101) without varying from the scope of the invention. In the situation where other network elements are performing selection, all base stations will forward FQI bits to the network element, and that the network element will transmit FORWARD_FRAME messages to base stations having the best FQI. It is intended that such changes come within the scope of the following claims.

What is claimed is:

1. A method for performing selection within a communication system, the method comprising the steps of:

receiving first frame quality information (FQI) bits from a first base station without receiving the first frame, wherein the first FQI bits corresponds to a quality of the first frame received by the first base station;

receiving second FQI bits from a second base station without receiving the second frame, wherein the second FQI bits corresponds to a quality of the second frame received by the second base station;

determining a base station having a best FQI bits from the first FQI bits and the second FQI bits;

transmitting a message to the base station having the best FQI bits, wherein the message instructs the base station to forward a frame to a destination; and receiving the first frame from the first base station in response to the message.

2. The method of claim 1 further comprising the steps of:

determining if the best FQI bits are above a threshold; and performing the step of transmitting only when the best FQI bits are above a threshold.

3. The method of claim 1 wherein the step of transmitting the message to the base station having the bests FQI bits comprises the step of transmitting a message containing a frame identification, and a destination address to the base station having the best FQI bits.

4. The method of claim 1 wherein the step of receiving the first FQI bits comprises the step of receiving FQI bits from a forward error correction (FEC) function.

5. The method of claim 1 wherein the step of receiving first FQI bits from the first base station comprises the step of receiving by an anchor base station, the FQI bits from the first base station, wherein the first base station and the anchor station are in soft handoff with a remote unit.

6. The method of claim 1 wherein the step of determining a base station having the best FQI bits comprises the step of determining a base station in soft handoff with a remote unit having the best FQI bits.

7. The method of claim 1 further comprising the steps of:

receiving, by the base station having the best FQI bits, the message; and forwarding the frame to a destination based on the step of receiving.

8. A method for performing selection within a communication system, the method comprising the steps of:

receiving, by a first base station, a frame transmitted by a remote unit;

determining, by the first base station, a first frame quality for the frame;

receiving, by the first base station, a second frame quality for the frame received by a second base station, wherein the second frame quality is received without receiving the frame from the second base station;

determining a base station having a best frame quality; and transmitting a message to the second base station when the second base station is the base station having the best frame quality, wherein the message instructs the second base station to forward the frame to a destination, otherwise forwarding the frame received by the first base station to the destination.

9. The method of claim 8 further comprising the steps of:

determining if the base station having the best frame quality has a frame quality above a threshold; and performing the step of transmitting only when the best frame quality is above the threshold.

10. The method of claim 8 wherein the step of transmitting the message to the second base station comprises the step of transmitting a message containing a frame identification, and a destination address to the second base station.

11. The method of claim 8 wherein the step of receiving the second frame quality comprises the step of receiving FQI bits from a forward error correction (FEC) function.

12. The method of claim 8 wherein the step of receiving, by the first base station, a second frame quality for the frame received by a second base station comprises the step of receiving, by the first base station, a second frame quality for the frame received by a second base station, wherein the first and the second base stations are in soft handoff with a remote unit.

13. A selector comprising:
    an input comprising a plurality of frame quality information (FQI) bits, wherein the frame is not included with the FQI bits; and
    an output comprising a message to a base station having a best frame quality, wherein the message instructs the base station to forward a frame to a destination.

14. The selector of claim 13 wherein the plurality of FQI bits comprises FQI bits transmitted from a plurality of base stations in soft handoff with a remote unit.

15. The selector of claim 13 wherein the message comprises a frame identification and a destination address.

16. The selector of claim 13 wherein the FQI bits comprise bits from a forward error correction (FEC) function.

17. The selector of claim 13 wherein the message instructs the base station to forward the frame through a switch to a connected network.

* * * * *